(12) United States Patent
Altman et al.

(10) Patent No.: US 11,316,878 B2
(45) Date of Patent: *Apr. 26, 2022

(54) SYSTEM AND METHOD FOR MALWARE DETECTION

(71) Applicant: Verint Systems Ltd., Pituach (IL)

(72) Inventors: Yuval Altman, Herzeliya (IL); Assaf Yosef Kere, Ramat Gan (IL); Ido Krupkin, Gan Yavne (IL); Pinhas Rozenblum, Tzur Hadasa (IL)

(73) Assignee: COGNYTE TECHNOLOGIES ISRAEL LTD., Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,143

(22) Filed: Aug. 7, 2018

(65) Prior Publication Data

US 2019/0034631 A1 Jan. 31, 2019

Related U.S. Application Data

(63) Continuation of application No. 13/874,339, filed on Apr. 30, 2013, now Pat. No. 10,061,922.

(51) Int. Cl.
*H04L 29/06* (2006.01)
*G06F 21/52* (2013.01)
*G06F 21/56* (2013.01)

(52) U.S. Cl.
CPC .......... *H04L 63/1425* (2013.01); *G06F 21/52* (2013.01); *G06F 21/56* (2013.01); *G06F 21/566* (2013.01)

(58) Field of Classification Search
CPC ........ G06F 21/52; G06F 21/56; G06F 21/566; H04L 63/14; H04L 63/1408; H04L 63/1416; H04L 63/1425
See application file for complete search history.

(56) References Cited

U.S. PATENT DOCUMENTS 5,689,442 A 11/1997 Swanson et al.
6,404,857 B1 6/2002 Blair et al.
(Continued)

FOREIGN PATENT DOCUMENTS

WO 2013/014672 1/2013

OTHER PUBLICATIONS

Aho, Alfred V., et al., "Efficient String Matching: An Aid to Bibliographic Search," Communication of the ACM, Jun. 1975, vol. 18, No. 6, pp. 333-340.
(Continued)

*Primary Examiner* — Matthew Smithers
*Assistant Examiner* — Alexander R Lapian
(74) *Attorney, Agent, or Firm* — Isus Intellectual Property PLLC; Anthony Jason Mirabito

(57) ABSTRACT

Systems and methods for malware detection techniques, which detect malware by identifying the C&C communication between the malware and the remote host. In particular, the disclosed techniques distinguish between request-response transactions that carry C&C communication and request-response transactions of innocent traffic. Individual request-response transactions may be analyzed rather than entire flows, and fine-granularity features examined within the transactions. As such, these methods and systems are highly effective in distinguishing between malware C&C communication and innocent traffic, i.e., in detecting malware with high detection probability and few false alarms.

19 Claims, 4 Drawing Sheets

(56) References Cited

U.S. PATENT DOCUMENTS

| | | |
|---|---|---|
| 6,587,124 B1 | 7/2003 | Slaby |
| 6,718,023 B1 | 4/2004 | Zolotov |
| 6,741,992 B1 | 5/2004 | McFadden |
| 6,757,361 B2 | 6/2004 | Blair et al. |
| 7,134,141 B2 | 11/2006 | Crosbie |
| 7,216,162 B2 | 5/2007 | Amit et al. |
| 7,225,343 B1 | 5/2007 | Honig et al. |
| 7,287,278 B2 | 10/2007 | Liang |
| 7,466,816 B2 | 12/2008 | Blair |
| RE40,634 E | 2/2009 | Blair et al. |
| 7,587,041 B2 | 9/2009 | Blair |
| RE43,103 E | 1/2012 | Rozman et al. |
| 8,122,007 B2 | 2/2012 | Mayer et al. |
| 8,165,449 B2 | 4/2012 | Ludwig et al. |
| 8,176,527 B1 | 5/2012 | Njemanze et al. |
| 8,201,245 B2 | 6/2012 | Dewey et al. |
| 8,204,984 B1* | 6/2012 | Aziz .................. H04L 63/0227 709/224 |
| RE43,528 E | 7/2012 | Rozman et al. |
| RE43,529 E | 7/2012 | Rozman et al. |
| 8,224,761 B1 | 7/2012 | Rockwood |
| RE43,987 E | 2/2013 | Rozman et al. |
| 8,402,543 B1* | 3/2013 | Ranjan ................ H04L 63/1416 726/23 |
| 8,413,244 B1 | 4/2013 | Nachenberg |
| 8,499,348 B1 | 7/2013 | Rubin |
| 8,555,388 B1* | 10/2013 | Wang .................. H04L 63/1425 726/23 |
| 8,578,493 B1 | 11/2013 | McFadden |
| 8,595,843 B1* | 11/2013 | McCabe ................ H04L 69/24 709/223 |
| 8,682,812 B1 | 3/2014 | Ranjan |
| 8,762,948 B1 | 6/2014 | Zaitsev |
| 8,838,951 B1 | 9/2014 | Hicks et al. |
| 8,839,417 B1 | 9/2014 | Jordan |
| 8,850,579 B1 | 9/2014 | Kalinichenko |
| 8,869,268 B1 | 10/2014 | Barger |
| 9,635,039 B1 | 4/2017 | Islam et al. |
| 2002/0129140 A1 | 9/2002 | Peled et al. |
| 2003/0097439 A1 | 5/2003 | Strayer et al. |
| 2004/0221178 A1 | 11/2004 | Aaron et al. |
| 2005/0018618 A1 | 1/2005 | Mualem et al. |
| 2006/0253584 A1 | 11/2006 | Dixon et al. |
| 2007/0180509 A1 | 8/2007 | Swartz et al. |
| 2007/0186284 A1 | 8/2007 | McConnell |
| 2007/0192863 A1* | 8/2007 | Kapoor .................. G06F 9/505 726/23 |
| 2007/0294768 A1 | 12/2007 | Moskovitch et al. |
| 2008/0014873 A1 | 1/2008 | Krayer et al. |
| 2008/0028463 A1 | 1/2008 | Dagon et al. |
| 2008/0141376 A1 | 6/2008 | Clausen et al. |
| 2008/0184371 A1 | 7/2008 | Moskovitch et al. |
| 2008/0196104 A1 | 8/2008 | Tuvell et al. |
| 2008/0261192 A1 | 10/2008 | Huang et al. |
| 2008/0285464 A1 | 11/2008 | Katzir |
| 2009/0106842 A1 | 4/2009 | Durie |
| 2009/0144216 A1 | 6/2009 | Zhou et al. |
| 2009/0150999 A1 | 6/2009 | Dewey et al. |
| 2009/0158430 A1 | 6/2009 | Borders |
| 2009/0216760 A1 | 8/2009 | Bennett |
| 2009/0249484 A1 | 10/2009 | Howard et al. |
| 2009/0282476 A1 | 11/2009 | Nachenberg et al. |
| 2010/0037314 A1 | 2/2010 | Perdisci |
| 2010/0071065 A1 | 3/2010 | Khan et al. |
| 2010/0100949 A1 | 4/2010 | Sonwane |
| 2010/0138919 A1* | 6/2010 | Peng .................. H04L 29/12009 726/22 |
| 2010/0154059 A1 | 6/2010 | McNamee et al. |
| 2010/0186088 A1 | 7/2010 | Banerjee et al. |
| 2010/0274799 A1* | 10/2010 | Lee .................. H04L 41/12 707/769 |
| 2011/0099620 A1 | 4/2011 | Stavrou et al. |
| 2011/0154497 A1 | 6/2011 | Bailey |
| 2011/0167494 A1 | 7/2011 | Bowen et al. |
| 2011/0271341 A1 | 11/2011 | Satish et al. |
| 2011/0302653 A1 | 12/2011 | Frantz et al. |
| 2011/0320816 A1 | 12/2011 | Yao et al. |
| 2012/0017281 A1 | 1/2012 | Banerjee |
| 2012/0167221 A1 | 6/2012 | Kang et al. |
| 2012/0174225 A1 | 7/2012 | Shyamsunder et al. |
| 2012/0222117 A1 | 8/2012 | Wong et al. |
| 2012/0304244 A1 | 11/2012 | Xie et al. |
| 2012/0311708 A1 | 12/2012 | Agarwal et al. |
| 2012/0331556 A1 | 12/2012 | Alperovitch et al. |
| 2013/0014253 A1 | 1/2013 | Neou |
| 2013/0097699 A1* | 4/2013 | Balupari ................ G06F 21/552 726/22 |
| 2013/0133072 A1 | 5/2013 | Kraitsman et al. |
| 2013/0174256 A1* | 7/2013 | Powers ................ H04L 63/1416 726/23 |
| 2013/0232574 A1* | 9/2013 | Carothers ............ H04L 63/1441 726/22 |
| 2013/0247184 A1* | 9/2013 | Mahadik ............. H04L 63/1433 726/22 |
| 2013/0333038 A1 | 12/2013 | Chien |
| 2014/0075557 A1 | 3/2014 | Balabine et al. |
| 2014/0165207 A1 | 6/2014 | Engel et al. |
| 2014/0207917 A1 | 7/2014 | Tock et al. |
| 2014/0298469 A1 | 10/2014 | Marion et al. |
| 2015/0135326 A1 | 5/2015 | Bailey, Jr. |
| 2016/0099963 A1* | 4/2016 | Mahaffey ............ H04L 63/1408 726/25 |

OTHER PUBLICATIONS

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," RAID, 2007, pp. 178-197.

Bayer, U., et al., Scalable, Behavior-Based Malware Clustering, Secure Systems Lab, Technical University, Vienna, 2009, 18 pages.

Bilge, Leyla, et al., "EXPOSURE: Finding Malicious Domains Using Passive DNS Analysis," Feb. 2011, 17 pages.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

(56) References Cited

OTHER PUBLICATIONS

Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.
Gu, G., et al., "BotSniffer: Detecting Botnet Command and Control Channels in Network Traffic," Proceedings of the 15th Annual Network and Distributed System Security Symposium (NDSS'08), San Diego, California, 2008, 18 pages.
Jacob, G., et al., "JACKSTRAWS: Picking Command and Control Connections from Bot Traffic," Proceedings of the 20th Usenix Security Symposium, San Francisco, 2011, 16 pages.
Lakhina, A., et al., "Mining Anomalies Using Traffic Feature Distributions," SIGCOMM, 2005, pp. 217-228.
Liu, Rong-Tai, et al., "A Fast Pattern-Match Engine for Network Processor-based NIDS," Proceedings of the 20th International Conference on Information Technology (ITCC'04), Dec. 5, 2006, 23 pages.
Livadas, C., et al., "Using Machine Learning Techniques to Identify Botnet Traffic," In 2nd IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector, Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S Ramon COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.
Tian, Z-H, et al., "An Architecture for Intrusion Detection Using Honey Pot," Proceedings of the Second International Conference on Machine Learning and Cybernetics, Xi'an, 2003, pp. 2096-2100.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the 22nd Annual Computer Security Applications Conference, Miami Beach, Florida, Dec. 2006, ten pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 22 pages.
European Search Report, dated Mar. 24, 2014, received in connection with corresponding European Application No. 13189920.
European Search Report, dated Jan. 15, 2014, received in connection with corresponding European Application No. 13165912.

\* cited by examiner

SYSTEM AND METHOD FOR MALWARE DETECTION

CROSS REFERENCE TO RELATED APPLICATIONS

This application is a continuation of and claims priority to U.S. Pat. No. 10,061,922 filed on Apr. 30, 2013, which claims priority to a foreign application originally filed in Israel on Apr. 30, 2012 and bearing Israel Patent Application Serial No. 219,499. These two prior applications are incorporated by reference as if set forth herein in their entirety.

FIELD OF THE DISCLOSURE

The present disclosure relates generally to data security, and particularly to methods and systems for detecting malicious software in computer systems.

BACKGROUND OF THE DISCLOSURE

Various types of malicious software, such as viruses, worms and Trojan horses, are used for conducting illegitimate operations in computer systems. Malicious software may be used, for example, for causing damage to data or equipment, or for extracting or modifying data. Some types of malicious software communicate with a remote host, for example for Command and Control (C&C) purposes.

Various techniques for detecting malicious software are known in the art. For example, Rieck et al. describe methods for detecting malicious software at a point when it initiates contact with its maintainer, in "Botzilla: Detecting the 'Phoning Home' of Malicious Software," Proceedings of the ACM Symposium on Applied Computing (SAC), Sierre, Switzerland, Mar. 22-26, 2010, which is incorporated herein by reference.

Jacob et al. describes a system for identifying C&C connections, in "JACKSTRAWS: Picking Command and Control Connections from Bot Traffic," Proceedings of the $20^{th}$ Usenix Security Symposium, San Francisco, Calif., Aug. 8-12, 2011, which is incorporated herein by reference.

Gu et al. describe a method that uses network-based anomaly detection to identify botnet C&C channels in a local area network, in "BotSniffer: Detecting Botnet Command and Control Channels in Network Traffic," Proceedings of the $15^{th}$ Annual Network and Distributed System Security Symposium (NDSS '08), San Diego, Calif., February, 2008, which is incorporated herein by reference.

Gu et al. describe a C&C detection framework that is independent of botnet C&C protocol and structure, in "BotMiner: Clustering Analysis of Network Traffic for Protocol- and Structure-Independent Botnet Detection," Proceedings of the $17^{th}$ USENIX Security Symposium, San Jose, Calif., 2008, which is incorporated herein by reference.

Eslahi describes methods for detecting HTTP-based Botnets based on the network behaviour analysis, in "botAnalytics: Improving HTTP-Based Botnet Detection by Using Network Behavior Analysis System," Faculty of Computer Science and Information Technology, University of Malaya, 2010, which is incorporated herein by reference.

SUMMARY OF THE DISCLOSURE

An embodiment that is described herein provides a method including monitoring request-response transactions that are exchanged in a computer system. One or more subsets of the monitored request-response transactions, which are exchanged with one or more respective nodes in the computer system, are extracted. At least one feature is evaluated over the request-response transactions in the subsets. Based on the evaluated feature, an identification is made whether the request-response transactions in the subsets are exchanged with a malicious software in the nodes.

In an embodiment, extracting the subsets includes extracting the request-response transactions that are exchanged between one or more hosts and a given client, and identifying whether the request-response transactions in the subsets are exchanged with the malicious software includes detecting that the malicious software runs in the given client. In another embodiment, extracting the subsets includes extracting the request-response transactions that are exchanged between one or more clients and a given host, and identifying whether the request-response transactions in the subsets are exchanged with the malicious software includes detecting that the given host controls the malicious software.

In some embodiments, evaluating the feature includes determining the feature over header fields of the request-response transactions. In an embodiment, evaluating the feature includes determining the feature over a predefined number of first content bytes at a beginning of the request-response transactions. In a disclosed embodiment, the feature includes a characteristic of one or more underlying protocols used for transmitting the request-response transactions.

In some embodiments, evaluating the feature includes estimating an aggregated statistical property of the at least one feature over the request-response transactions in the subsets, and identifying whether the request-response transactions are exchanged with the malicious software includes checking whether the aggregated statistical property meets a malware detection criterion.

In an embodiment, the at least one feature includes multiple different features, and estimating the aggregated statistical property includes evaluating the aggregated statistical property over the multiple different features. In another embodiment, the predefined criterion distinguishes between a first statistical distribution in values of the feature, which is indicative of the malicious software, and a second statistical distribution that is indicative of innocent traffic. In yet another embodiment, the method includes adaptively adjusting the malware detection criterion.

In some embodiments, monitoring of the transactions and extraction of the subsets are performed by a first processor, and evaluation of the feature and identification of the malicious software are performed by a second processor separate from the first processor. In an embodiment, the method includes indicating by the second processor to the first processor traffic that is to be discarded from evaluation.

There is additionally provided, in accordance with an embodiment that is described herein, apparatus including an interface and a processor. The interface is configured to monitor request-response transactions that are exchanged in a computer system. The processor is configured to extract one or more subsets of the monitored request-response transactions, which are exchanged with one or more respective nodes in the computer system, to evaluate at least one feature over the request-response transactions in the subsets, and, based on the evaluated feature, to identify whether the request-response transactions in the subsets are exchanged with a malicious software in the nodes.

The present disclosure will be more fully understood from the following detailed description of the embodiments thereof, taken together with the drawings in which:

DETAILED DESCRIPTION OF EMBODIMENTS

Overview

Figure 1:
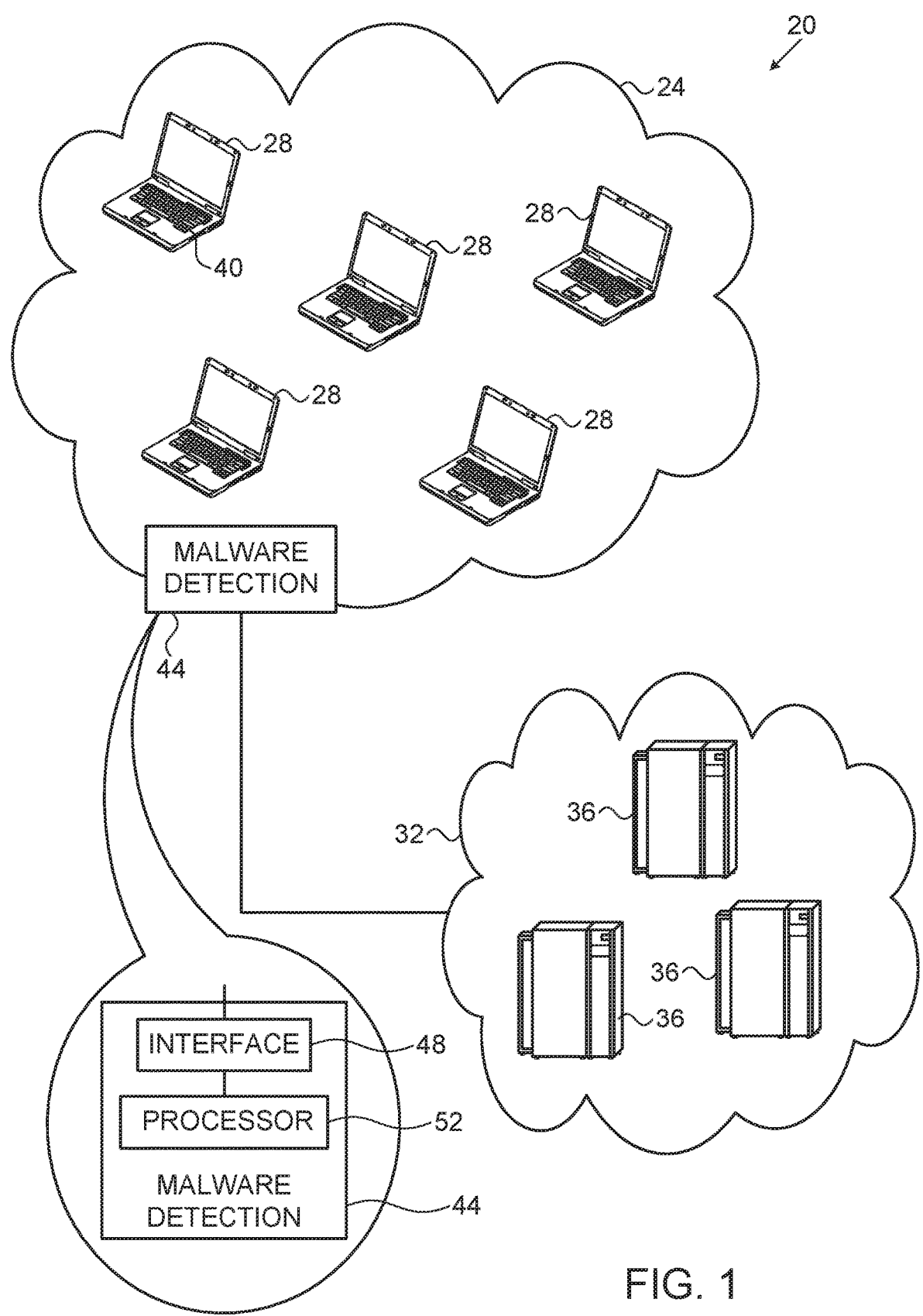
FIG. 1 is a block diagram that schematically illustrates a computer network employing malicious software detection, in accordance with an embodiment that is described herein.

Some types of malicious software ("malware") are controlled by a remote host. Communication between the malware and the host is referred to herein as Command and Control (C&C) communication, and it may involve communication from the host to the malware and/or from the malware to the host. In some malware types, the C&C communication is disguised in request-response transactions of a conventional communication protocol, such as in Hyper Text Transfer Protocol (HTTP), HTTP Secure (HTTPS), Domain Name Service (DNS) or Simple Mail Transfer Protocol (SMTP) transactions.

This disguise is typically meant to bypass security equipment such as firewalls. Many firewalls do not permit an unknown host to start communicating in the protected area, therefore the malware typically initiates the connection with its remote controlling host. In many cases the malware repeats this process from time to time in order to receive commands from the remote host.

Embodiments that are described herein provide improved malware detection techniques, which detect malware by identifying the C&C communication between the malware and the remote host. In particular, the disclosed techniques distinguish between request-response transactions that carry C&C communication and request-response transactions of innocent traffic.

The methods and systems described herein analyze individual request-response transactions rather than entire flows, and examine fine-granularity features within the transactions. As such, these methods and systems are highly effective in distinguishing between malware C&C communication and innocent traffic, i.e., in detecting malware with high detection probability and few false alarms. Some disclosed techniques identify C&C communication by evaluating statistical aggregates over such fine-granularity features, possibly over different time intervals.

In some embodiments, a malware detection unit monitors request-response transactions that are exchanged between computers in a computer system. The unit evaluates certain features of these transactions in order to identify characteristics that can be indicative of C&C communication. Such distinguishing features may relate, for example, to the lengths of header fields in the request or response, the number of fields, the order of fields, gaps or spaces that appear in the fields, or statistical features of these fields like the number of distinct values taken by a field, and many others. Several examples of features are explained and demonstrated below.

In a typical embodiment, the malware detection unit extracts a subset of the request-response transactions that are exchanged with a given node of the computer system, such as the transactions with a given client, with a given host, or between one or more clients (e.g., an individual client, an office or an organization) and a given host. The unit evaluates one or more features over the transactions in the subset. Based on the evaluated features, the unit assesses whether the transactions comprise malware C&C communication that is exchanged with the given node.

In some embodiments, the malware detection unit identifies C&C communication by evaluating an aggregated statistical property of a set of features over the transactions in the subset, and checking whether the statistical property meets a certain malware detection criterion. Several examples of aggregated statistical properties of features, and corresponding malware detection criteria, are described herein.

In some embodiments, the malware detection unit adjusts the malware detection criteria adaptively, for example using a training process that is based on positive examples (transactions that are known to carry C&C communication) and/or negative examples (transactions that are known to be innocent). Such a training process enables the malware detection unit to identify previously-unrecognized malware, even without a training set that is specific to that malware. In some embodiments, the malware detection unit is implemented using a distributed, scalable configuration that is described herein.

System Description

FIG. 1 is a block diagram that schematically illustrates a computer system 20 employing malicious software detection, in accordance with an embodiment that is described herein. The present example shows an internal computer network 24 of an organization, which comprises multiple computers 28, such as personal computers, workstations, mobile computing or communication devices or virtual machines. Network 24 is connected to a Wide Area Network (WAN) 32, such as the Internet. Computers 28 may communicate with one another over network 24, and/or with servers or other computers 36 in network 32. The system configuration of FIG. 1 is shown purely by way of example, and the disclosed techniques can also be used with various other suitable system configurations.

In some scenarios, a certain computer 28 in network 24 may be infected with malicious software 40 (referred to as "malware"), for example a virus, a worm or a Trojan horse. The malware may carry out various kinds of illegitimate actions, for example steal data from the infected computer or otherwise from network 24, modify or damage data, or cause damage to the infected computer or other equipment of network 24.

Some types of malware are controlled by a remote host. In the present example, malware 40 is controlled by one of computers 36, external to network 24. Communication between the malware and the remote host may be bidirectional (e.g., command and control between the host and the malware, and extracted data from the malware to the host) or unidirectional (e.g., only from the host to the malware, or only from the malware to the host).

In some embodiments, a malware detection unit 44 identifies malicious software that has infected one or more of computers 28, such as malware 40. Unit 44 detects malware by monitoring communication in network 24, e.g., internal communication within network 24 and/or communication between network 24 and network 32. In some embodiments, as will be explained in detail below, unit 40 attempts to identify Command and Control (C&C) communication between malware 40 and its remote host.

In an embodiment, malware detection unit 44 comprises an interface 48 for connecting to network 24, and a processor 52 that carries out the malware detection techniques described herein. Interface 48 may comprise, for example, a network probe, or any other suitable network interface. In some embodiments, the functions of processor 52 are partitioned among multiple processors (e.g., servers) in a distributed configuration that enables high scalability. An example configuration of this sort is described in FIG. 4 below.

The configurations of system 20 and unit 44 shown in FIG. 1 are example configurations, which are chosen purely for the sake of conceptual clarity. In alternative embodiments, any other suitable configuration of system 20 and/or unit 44 can be used. For example, in the example of FIG. 1 unit 44 is placed between network 24 and WAN 32, such that the traffic between the two networks passes through unit 44. In alternative embodiments, unit 44 may comprise a node in network 24 that is provided with network traffic for monitoring, but without having the network traffic pass through it.

Some elements of unit 44 may be implemented in hardware, e.g., in one or more Application-Specific Integrated Circuits (ASICs), Field-Programmable Gate Arrays (FPGAs) or network processors. Additionally or alternatively, some elements of unit 44 can be implemented using software, or using a combination of hardware and software elements.

Some of the functions of unit 44, such as the functions of processor 52, may be carried out using one or more general-purpose processors (e.g., servers), which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Malware Detection Scheme

As noted above, malware 40 is assumed to communicate with a remote host. The communication between the malware and the host is referred to herein as C&C communication. C&C communication may be conducted in either direction, i.e., from the host to the malware and/or from the malware to the host. Unit 44 typically detects malware by identifying the C&C communication, and distinguishing this sort of communication from legitimate network traffic.

In some embodiments, unit 44 identifies C&C communication that is disguised as an exchange of request-response transactions of a conventional protocol, such as Hyper Text Transfer Protocol (HTTP), HTTP Secure (HTTPS) or Domain Name Service (DNS). In this sort of malware implementation, the computer infected with the malware (referred to as a client) communicates with the remote host (referred to as host) using request-response transactions of the protocol in question, such that the C&C communication (e.g., commands and/or exchanged data) are disguised as parts of the transactions.

In the context of the present patent application and in the claims, the term "request-response transaction" refers to any exchange of messages between two endpoints (e.g., a client and a host) in which one endpoint sends a request message to the other endpoint, and the other endpoint answers the request message with a response message. Some examples of request-response transactions comprise HTTP request and HTTP response, HTTPS request and HTTPS response, DNS request and DNS response, Simple Mail Transfer Protocol (SMTP) request and SMTP response, or any other suitable transaction type.

In some types of request-response transactions, multiple requests are sent before the corresponding responses begin to arrive. Nevertheless, each response corresponds to a particular request. This scenario occurs, for example, in HTTP pipelining. Such types of transactions are also regarded as request-response transactions in the present context. Request-response transactions are typically (although not necessarily) specified in various client-server protocols.

In some embodiments, processor 52 of unit 44 monitors request-response transactions that are exchanged in system 20, and extracts the subset of transactions that are conducted between a given client and a given host. In an example embodiment, the given client and the given host are identified by their respective Internet Protocol (IP) addresses. In other words, the transactions in the subset are identified by a particular client IP address and host IP address.

Generally, however, the client and/or host may be identified using any other suitable means. For example, processor 52 may obtain a host name from the DNS query preceding the access to the host, or from the HTTP headers within an HTTP request. As another example, processor 52 may deduce client IP addresses from passive analysis of RADIUS traffic, or by receiving RADIUS records from a RADIUS server (not shown in the figure).

Processor 52 evaluates one or more features over the subset of request-response transactions pertaining to a given client-host pair. If the evaluated features meet a certain malware detection criterion, processor 52 issues an alert. Any suitable type of alert can be generated, such as, for example, an alert indicating that the given client is likely to be infected with malware, an alert indicating that the given host is likely to be a malicious remote host that controls malware, or an alert indicating both the infected client and the malicious host.

Several example features, which can be used for differentiating between malware C&C communication and innocent traffic, are described below. These features distinguish malware C&C communication from innocent browsing traffic of network users, as well as from traffic of applications that innocently exploit the request-response protocols (e.g., Skype).

The description that follows refers to analysis of request-response transactions between a given client and a given host. In alternative embodiments, however, unit 44 may analyze the request-response transactions for a given client (possibly with multiple hosts), in order to verify whether the given client is infected with malware (which possibly conducts C&C communication with multiple hosts). Further alternatively, unit 44 may analyze the request-response transactions for a given host (possibly with multiple clients), in order to verify whether the given host controls malware in one or more clients (which, in turn, increases the likelihood the host is indeed malicious).

Figure 2A:
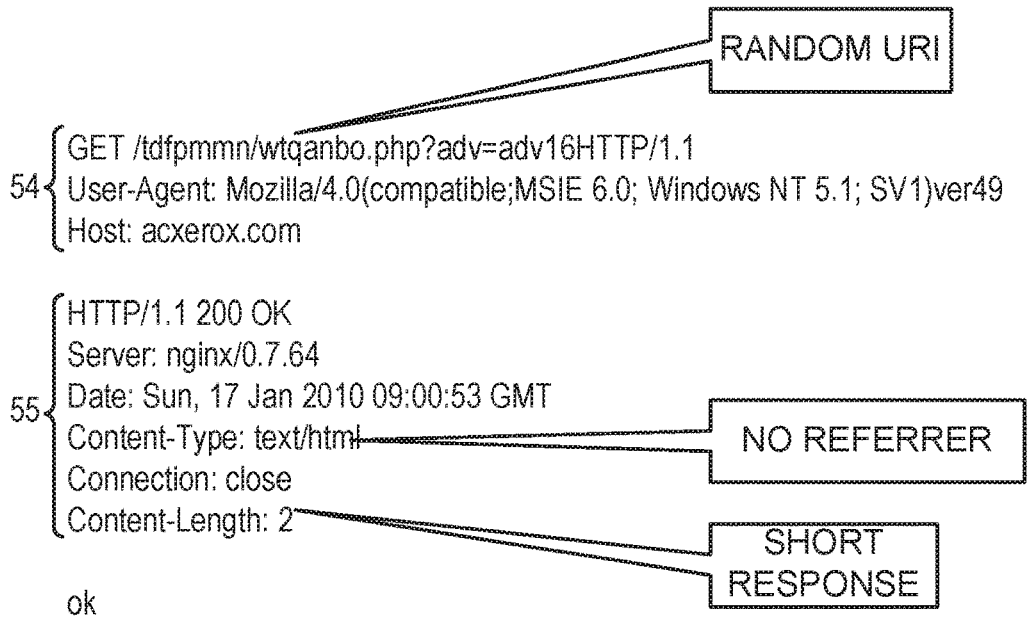
FIGS. 2A and 2B are diagrams showing examples of features indicative of malicious software in HTTP request-response transactions, in accordance with embodiments that are described herein.
Figure 2B:
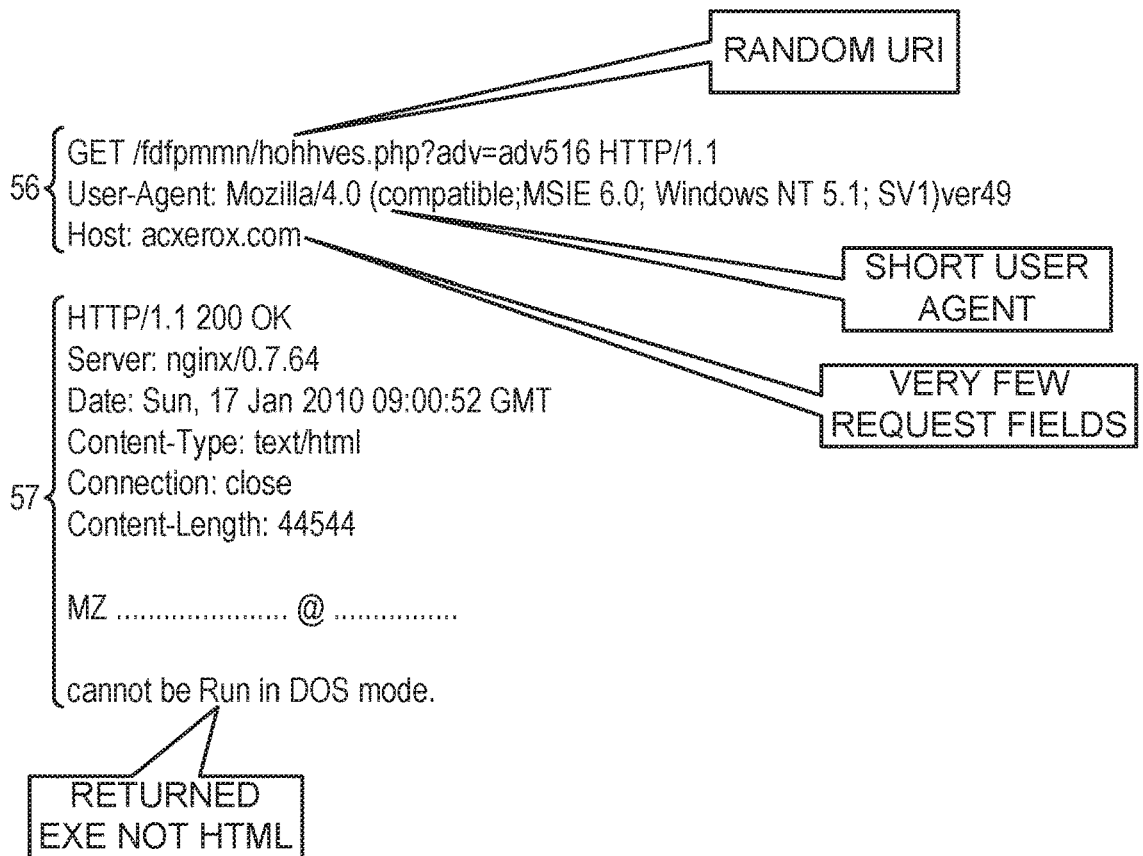

FIGS. 2A and 2B are diagrams showing examples of features indicative of malicious software in HTTP request-response transactions, in accordance with embodiments that are described herein.

FIG. 2A shows an example HTTP request 54 sent by a client, and a corresponding HTTP response 55 returned by the host. In this example, the Uniform Resource Identifier (URI) on the first line of the HTTP request appears to be a random string rather than a meaningful name. This feature may be indicative of a malware C&C communication disguised as innocent HTTP traffic. As another example, HTTP response 55 does not indicate any referrer. Moreover, the response content ("ok") is short (Content-Length=2). These features may also be indicative of disguised malware C&C communication.

FIG. 2B shows another example HTTP request 56 sent by a client, and a corresponding HTTP response 57 returned by the host. In this example too, the URI in the HTTP request appears to be a random string. In addition, the user agent in the HTTP request is short. Additionally, the HTTP request comprises only a small number of request fields. Moreover, the content returned in HTTP response 57 is an executable (EXE) rather than HTML. All these features may be indicative of disguised malware C&C communication.

These examples present several example features and corresponding malware detection criteria:

The URI in the request is a random string and not a meaningful name.
The response does not indicate a referrer.
The content length in the response is shorter than a certain threshold value.
The user agent in the request is shorter than a certain threshold value.
The number of fields in the request is smaller than a certain threshold value.
The returned content in the response in an executable.

Another example of a distinguishing feature is the length of the cookie field in the HTTP request, or the entropy of the sequence of bytes forming the value of the cookie field.

The features and malware detection criteria shown in FIGS. 2A and 2B are chosen purely by way of example. In alternative embodiments, any other suitable feature and criterion can be used for distinguishing between malware C&C communication and innocent traffic.

It is important to note that, in many cases, none of the above-described features is unambiguously indicative of malware when considered alone. The combined occurrence of multiple features, however, is typically indicative of malware with high confidence and small probability of false positives. Thus, processor 52 typically attempts to identify multiple occurrences of such features, often of different features, before declaring that malware is identified.

Typically, although not necessarily, processor 52 evaluates the features by examining one or more header fields of the transactions, and not the content payload of the transactions. In some embodiments, however, some of the content (e.g., the first data word of the content payload) may be considered.

Additionally or alternatively, a given feature may comprise a characteristic of an underlying protocol or protocols used for transmitting the request-response transactions, e.g., TCP/IP, UDP/IP or ICMP/IP, among others. Such characteristics may comprise, for example, IP addresses, port numbers, packet size in bytes, average packet size, packet timing, or any other suitable characteristic related to the transfer protocol.

In some embodiments, processor 52 calculates an aggregated statistical property of one or more features of the request-response transactions, and evaluates the malware detection criterion over the statistical property. In a typical embodiment, processor 52 evaluates an aggregate statistical property of a set of multiple different features. Such an aggregate statistical property can provide a better indication of malware, in comparison with a statistical property of a single feature.

Processor 52 may calculate the aggregated statistical property, for example, over the request-response transactions between a given client and a given host, over the request-response transactions of a given client (possibly with multiple hosts), or over the request-response transactions of a given host (possibly with multiple clients).

Processor 52 may evaluate any suitable statistical property of a certain feature of the transactions, for example a mean value of a feature, a standard deviation or variance of a feature, or a count of the distinct values of a feature. In an example embodiment, processor 52 evaluates the standard deviation of the length of the cookie field over multiple transactions between a given client and a given host. If the standard deviation is larger than a certain predefined value, processor 52 indicates that the given client may be infected with malware controlled by the given host.

Another example of an aggregate statistical property is the number of distinct values given to a certain feature, e.g., the number of distinct values taken by the cookie field. In alternative embodiments, processor 52 may calculate any other suitable aggregate statistical property of a given feature, and evaluate any other suitable malware detection criterion over the aggregate statistical property. In some embodiments, processor 52 calculates an estimate of the aggregate statistical property instead of the actual statistical property, in order to reduce computation complexity.

In some embodiments, the aggregate statistical property is calculated over specific values given to specific fields. For example, in an innocent Web site, most URIs will typically have repetitions across multiple request-response transactions (different users will access the same URI). A malicious host and its URIs, on the other hand, are typically accessed very rarely, and the repetitions are thus very low.

An example embodiment of counting the number of distinct values of a feature is counting the number of URIs used in a specific Web site. A malicious host may not have real URIs, the client will use the value in the URI as a way to send information, and the number of distinct URI values will thus be very high. Another example is counting the distinct values of the USER_AGENT field: Usually, all the HTTP communication of a certain client originates from one or two browsers installed on it, and therefore will have only one or two USER AGENT field values.

Defining the malware detection criterion over an aggregated statistical property of the transactions, and not over an individual transaction, improves the malware detection performance of unit 44. For example, in some cases the malware C&C communication is designed to intentionally randomize certain fields, so as to appear similar to innocent traffic. Nevertheless, the randomization process performed by the malware often does not perfectly imitate the statistical distribution of innocent traffic.

Therefore, the statistical properties of malware C&C transactions often differ from the statistical properties of truly innocent traffic. Evaluating the malware detection criterion over an aggregate statistical property of a feature enables processor 52 to detect these differences in statistical distribution, and therefore identify malware with high detection probability and few false alarms.

Thus, in some embodiments, the malware detection criterion distinguishes between the level of randomization of the value of a certain feature, assuming that C&C communication is characterized by a certain level of randomization, and innocent traffic is characterized by a different level of randomization.

In other embodiments, however, processor 52 may evaluate a malware detection criterion over one or more features of an individual transaction, without calculating any aggregate statistical property over multiple transactions.

In some embodiments, processor 52 adapts the malware detection criteria over time, using a learning algorithm. Processor 52 may adapt the malware detection criteria, for example, based on training sets of request-response transactions that are known to be malware C&C communication, and/or sets of request-response transactions that are known to be innocent traffic.

By evaluating features, and statistical properties of features, over known C&C communication and known innocent traffic, processor 52 is able to improve the detection performance of the malware detection criteria. The training process may be carried out using any suitable machine learning process, including both supervised and semi-supervised processes.

The training process enables the system to identify new malware without having a specific training set for this specific type of malware. Therefore, the training process enables the system to identify malware that is previously unrecognized, by identifying the malware characteristic features (e.g., fine-granularity features in transactions or aggregate statistical properties of such features). The training process is executed during initial setup of the system, and possibly in periodic calibrations.

Processor 52 may choose the time period over which to calculate a certain aggregate statistical property of a certain feature in various ways. In one embodiment, processor 52 uses one or more predefined time periods for evaluating a certain aggregate statistical property. In an embodiment, processor 52 may calculate the same aggregate statistical property over two different time periods, and evaluate the malware detection criterion (or different criteria) for the different time periods. This multi-time-period approach is useful in many cases, since some features convey different information when evaluated over different time periods (e.g., over minutes and over days).

In an alternative embodiment, processor 52 may detect distinct activity periods in the communication between the given client and the given host, which are separated by periods of inactivity. The processor may calculate the aggregate statistical property over each activity period. Further alternatively, processor 52 may set the time intervals for calculating an aggregate statistical property using any other suitable method.

Figure 3:
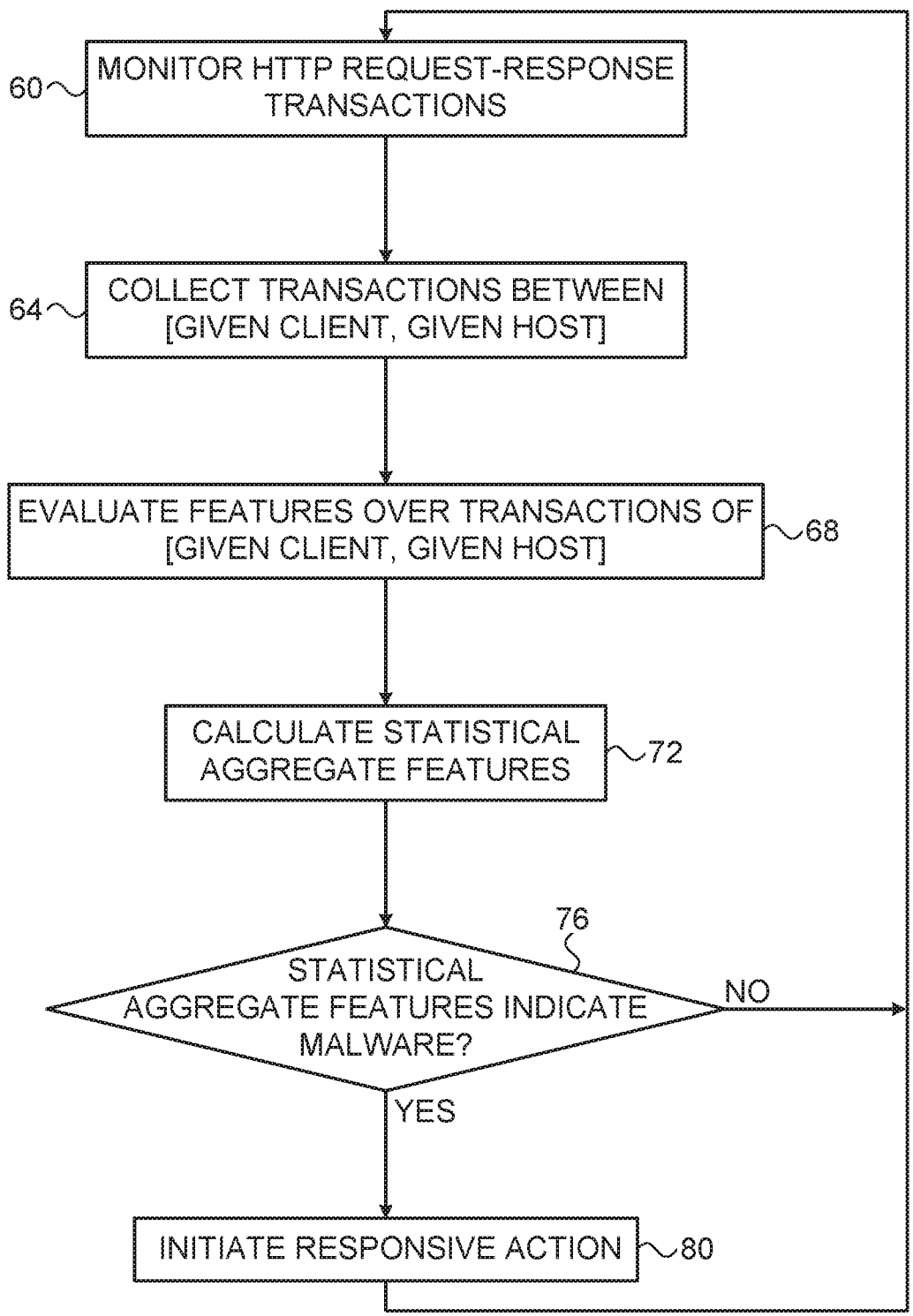
FIG. 3 is a flow chart that schematically illustrates a method for malicious software detection, in accordance with an embodiment that is described herein.

FIG. 3 is a flow chart that schematically illustrates a method for malicious software detection, in accordance with an embodiment that is described herein. The method begins with interface 48 (e.g., network probe) of unit 44 monitoring HTTP request-response transactions in system 20, at a monitoring step 60. Processor 52 of unit 44 collects the transactions between a given client and a give host, at a transaction extraction step 64. The record of a certain transaction is sometimes referred to as a Flow Summary Record (FSR).

Typically, before collecting and caching the transactions for subsequent processing, unit 44 discards the transactions that access the most popular hosts. For example, interface 48 or processor 52 may filter-out the transactions that access the one-hundred (or any other suitable number) most-frequently-accessed hosts.

Processor 52 then evaluates one or more features of the collected transactions of the given client and host, at a feature evaluation step 68. Processor 52 calculates one or more aggregate statistical properties of the features, at a statistics calculation step 72.

Processor 52 checks whether the aggregate statistical properties of the features are indicative of malware C&C communication, at a checking step 76. When implementing this step, processor 52 may use any suitable malware detection criterion, such as the malware detection criteria described above. If the aggregate statistical properties do not indicate malware C&C communication, the method loops back to step 60 above in which unit 44 continues to monitor request-response transactions.

If, on the other hand, the aggregate statistical properties indicate that the given client is infected with malware, processor 52 initiates a responsive action, at a responding step 80. Any suitable responsive action can be initiated, for example issuing an alert to an operator, and/or blocking the suspected transactions. The method loops back to step 60 above.

In some embodiments, the operator provides feedback regarding the alerts to processor 52. The feedback may indicate whether the alert truly corresponds to malware or whether it is a false positive. Processor 52 may use this feedback to further tune the detection criteria.

Example Scalable System Configuration

In some embodiments, the functions of processor 52 are implemented using multiple processors, e.g., servers, which are arranged in a distributed, scalable configuration.

Figure 4:
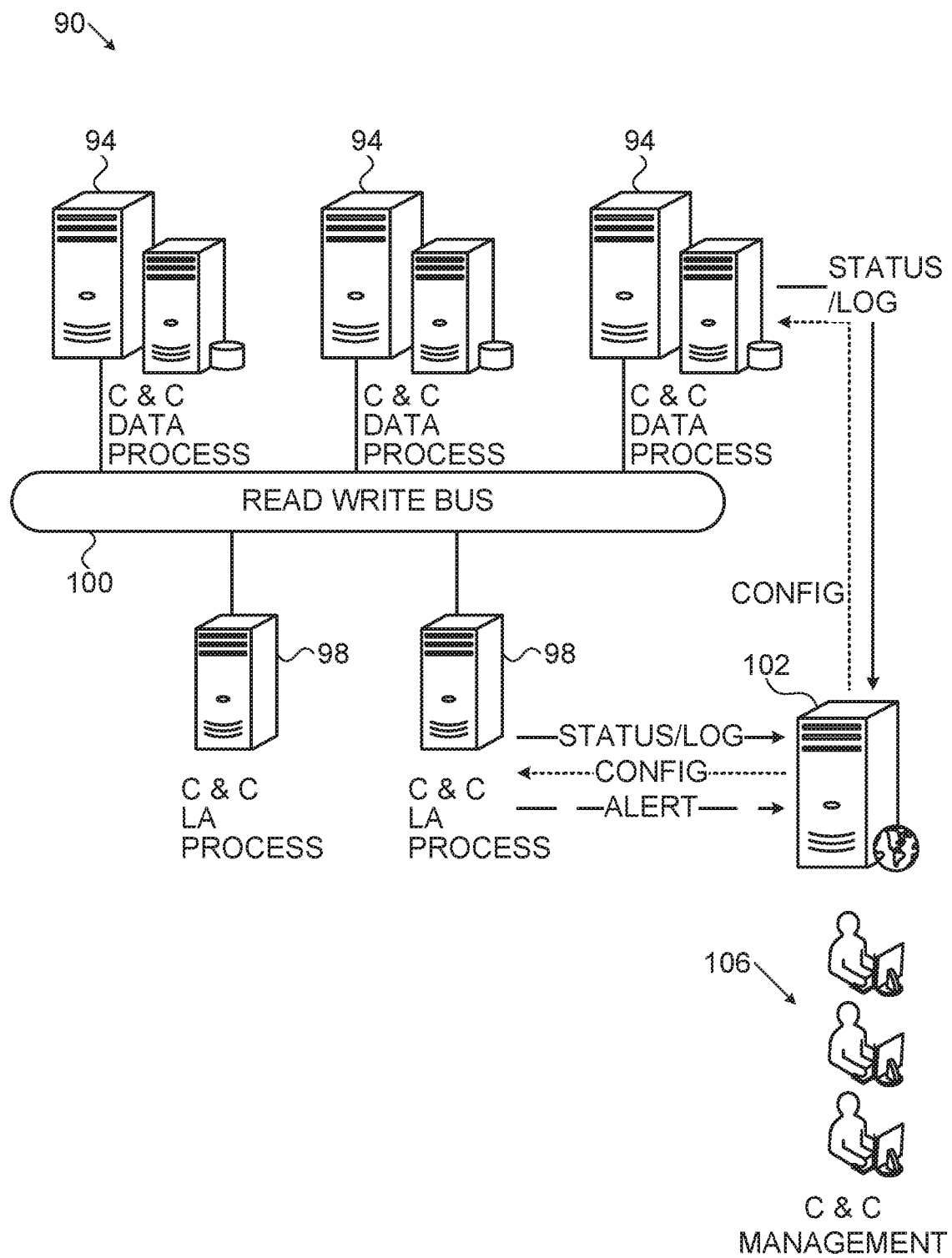
FIG. 4 is a block diagram that schematically illustrates a system for malicious software detection, in accordance with an embodiment that is described herein.

FIG. 4 is a block diagram that schematically illustrates a system 90 for malicious software detection, in accordance with an embodiment that is described herein. System 90 carries out the function of processor 52 in unit 44 of FIG. 1 above. In the present example, the malware detection process is partitioned into a C&C data process and a C&C Learning Algorithm (LA) process.

The C&C data process extracts transactions relating to certain [client,host] pairs (FSRs). The C&C LA process analyzes the extracted transactions, e.g., evaluates feature, calculates aggregate statistical properties of the features and evaluates malware detection criteria. System 90 comprises multiple C&C data process servers 94 that carry out the C&C data process, and multiple C&C LA process servers 98 that carry out the C&C LA process. Servers 94 and 98 communicate over a bus 100.

System 90 further comprises a management server 102, which receives status and log messages from servers 94 and 98, configures servers 94 and 98, and receives malware alerts from servers 98. The management server presents the malware alerts to one or more operators 106.

The configuration of system 90 lends itself to straightforward scalability and gradual growth. For example, the system may be initially deployed with a small number of severs 94 and 98, e.g., a single server of each type. The initial configuration is able to handle a modest initial transaction throughput. At a later stage, the system can be upgraded to support higher transaction throughput by adding additional servers 94 and/or 98.

In some embodiments, the creation of request-response transaction records and malware detection based on the records are performed on separate processors or computing platforms. For example, a probe/sniffer may monitor IP traffic, identify the applications of interest (e.g., HTTP or DNS) and, for each transaction in these applications, create the relevant request-response record. A separate analysis system in these embodiments analyzes the records and identifies malware. This sort of configuration increases the overall system performance, and allows the malware detection system to focus its processing power on its main purpose.

The processor that creates the request-response transaction records may also perform the task of filtering-out the transactions relating to the most-frequently-accessed hosts. In some embodiments, the malware detection system can direct this processor which traffic to filter-out (e.g., which applications, URIs, hosts or subnets to discard).

Although the embodiments described herein mainly address malware detection, the principles of the present disclosure can also be used for other applications, for example for identifying unauthorized applications that run of a clients within a network and communicate with the Internet.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
monitoring, with a network probe, request-response transactions that are exchanged in a computer system without the request-response transactions of the computer system passing through the network probe;
extracting subsets of the request-response transactions, wherein the subsets comprise request-response transactions that are exchanged between one or more clients and a given host and between one or more hosts and a given client;
evaluating at least one feature of the request-response transactions in the subsets over request-response transactions known to be associated with first malicious software and request-response transactions known to be not associated with the first malicious software, wherein the at least one feature comprises a characteristic of one or more underlying protocols used for transmitting the subsets of request-response transactions, wherein evaluating the at least one feature comprises estimating an aggregated statistical property of the at least one feature over the request-response transactions in the subsets over each of a plurality of different time periods; and
based on the evaluated at least one feature, identifying whether the request-response transactions in the subsets are exchanged with a second malicious software that runs in the given client.

2. The method according to claim 1, wherein extracting the subsets comprises extracting the request-response transactions that are exchanged between one or more clients and a given host, and wherein identifying whether the request-response transactions in the subsets are exchanged with the second malicious software comprises detecting that the given host controls the second malicious software.

3. The method according to claim 1, wherein evaluating the at least one feature comprises determining the feature over header fields of the request-response transactions.

4. The method according to claim 1, wherein evaluating the at least one feature comprises determining the feature over a predefined number of first content bytes at a beginning of the request-response transactions.

5. The method according to claim 1, wherein identifying whether the request-response transactions are exchanged with the second malicious software comprises checking whether the aggregated statistical property meets a malware detection criterion.

6. The method according to claim 5, wherein the at least one feature comprises multiple different features, and wherein estimating the aggregated statistical property comprises evaluating the aggregated statistical property over the multiple different features.

7. The method according to claim 5, wherein the malware detection criterion distinguishes between a first statistical distribution in values of the at least one feature, which is indicative of the first malicious software, and a second statistical distribution that is indicative of innocent traffic.

8. The method according to claim 5, and comprising adaptively adjusting the malware detection criterion.

9. The method according to claim 1, wherein monitoring of the transactions and extraction of the subsets are performed by a first processor, and wherein evaluation of the at least one feature and identification of the malicious software are performed by a second processor separate from the first processor.

10. The method according to claim 9, and comprising indicating by the second processor to the first processor traffic that is to be discarded from evaluation.

11. The method of claim 1, further comprising:
discarding transactions from the monitored request-response transactions that access a predetermined number of most-frequently-accessed-hosts.

12. The method of claim 1, wherein identifying whether the request-response transactions in the subset are exchanged with the first malicious software comprises detecting that the first malicious software runs in the given client.

13. An apparatus comprising:
a network probe, which is configured to monitor request-response transactions exchanged in a computer network without having the request-response transactions pass through the network probe;
a hardware processor, which is connected to the network probe and configured to execute software to:
evaluate at least one feature of the monitored request-response transactions over request- response transactions known to be associated with first malicious software and request-response transactions known to be not associated with the first malicious software by estimating an aggregated statistical property of the at least one feature over the request-response transactions in the subsets over each of a plurality of different time periods; and
based on the evaluation of the at least one feature, filter from the monitored request-response transactions at least one request-response transaction having the at least one feature indicating a presence of second malicious software in the request-response transaction, wherein the filtered at least one request-response transaction is one of the request-response transactions exchanged between one or more clients and a given host and between one or more hosts and a given client, wherein the at least one feature comprises a characteristic of one or more underlying protocols used for transmitting the at least one request-response transaction, and further wherein the processor is further configured to execute software to extract the at least one request-response transaction and to identify whether the request-response transaction is exchanged with the second malicious software that runs in the given client.

14. The apparatus according to claim 13, wherein the processor is configured to extract the at least one request-response transaction, and, by identifying whether the at least one request-response transaction in the plurality are exchanged with the second malicious software, to detect that a given host controls the second malicious software.

15. The apparatus according to claim 13, wherein the processor is configured to evaluate the feature over header fields of the at least one request-response transaction.

16. The apparatus according to claim 13, wherein the processor is configured to evaluate the feature over a predefined number of first content bytes at a beginning of the at least one request-response transaction.

17. The apparatus according to claim 13, wherein the processor is configured identify whether the at least one request-response transaction is exchanged with the malicious software by checking whether the aggregated statistical property meets a malware detection criterion.

18. The apparatus according to claim 17, wherein the at least one feature comprises multiple different features, and wherein the processor is configured to evaluate the aggregated statistical property over the multiple different features.

19. The method of claim 18, wherein the multiple different features comprises each of: repetitions of a Uniform Resource Identifier (URI) in given requests in which the URI is a random string, a given response not indicating a referrer, a content length in a given response being shorter than a certain threshold value, a user agent in a given request being shorter than a certain threshold value, a number of fields in a given request being smaller than a certain threshold value, or a returned content in a given response being an executable.

* * * * *